(12) United States Patent
Bingul et al.

(10) Patent No.: US 7,290,446 B2
(45) Date of Patent: Nov. 6, 2007

(54) DEVICE AND METHOD FOR MEASURING RATIOS OF DISPENSED LIQUIDS

(75) Inventors: Emir Bingul, Ardsley, NY (US); Carl Pfleger, Ridgefield, CT (US); Jeffrey T. Glidden, Danbury, CT (US)

(73) Assignee: PepsiCo, Inc., Purchase, NY (US)

( * ) Notice: Subject to any disclaimer, the term of this patent is extended or adjusted under 35 U.S.C. 154(b) by 151 days.

(21) Appl. No.: 11/043,663

(22) Filed: Jan. 26, 2005

(65) Prior Publication Data

US 2005/0160808 A1    Jul. 28, 2005

Related U.S. Application Data

(60) Provisional application No. 60/539,099, filed on Jan. 27, 2004.

(51) Int. Cl.
  *G01F 19/00* (2006.01)
(52) U.S. Cl. .......................................... 73/427; 222/49
(58) Field of Classification Search .................. 73/426, 73/427, 428; 222/23, 158, 29, 49; 141/94, 141/95, 325
See application file for complete search history.

(56) References Cited

U.S. PATENT DOCUMENTS

| | | | | |
|---|---|---|---|---|
| 4,293,008 A | * | 10/1981 | Coleman | 141/95 |
| 4,721,393 A | * | 1/1988 | Kwast | 366/341 |
| 4,762,251 A | * | 8/1988 | Berger | 222/49 |
| 5,758,540 A | * | 6/1998 | Davila et al. | 73/428 |

* cited by examiner

*Primary Examiner*—Robert Raevis
(74) *Attorney, Agent, or Firm*—Banner & Witcoff, Ltd.

(57) ABSTRACT

A device and method for determining Brix ratios of fountain-dispensed beverages that have different Brix ratios. The device includes a primary cup and a set of secondary cups that have different cross sectional areas. When determining a beverage Brix ratio, a select secondary cup is attached to the primary cup based on the ratio of the cross sectional areas of the primary cup and selected secondary cup. This ratio is based on the Brix ratio of the beverage. The determination is performed by flowing the water from the dispensing head forming the beverage into the primary cup and the syrup forming the beverage into the select secondary cup. A slider attached to one of the cups is moved to a select position based on the liquid level in the cup. The liquid level on the other cup is compared against the level defined by an indicia on the slider.

20 Claims, 3 Drawing Sheets

DEVICE AND METHOD FOR MEASURING RATIOS OF DISPENSED LIQUIDS

RELATED APPLICATION

This application claims priority under 35 U.S.C Sec. 119 from U.S. Provisional Patent Application No. 60/539,099 filed Jan. 27, 2004.

FIELD OF THE INVENTION

This invention is related generally to measuring the ratios of dispensed liquids, such as the syrup to water ratio of liquids used to make a blended beverage. More particularly, this invention is related to a system and method for measuring the syrup to water ratios of the syrups and water used to make different beverages when the ratio of these liquids are different for individual beverages.

BACKGROUND OF THE INVENTION

A fountain-dispensed beverage is a blend of two or more liquids; water and one or more syrups or concentrates. To ensure that a beverage having the desirable taste is dispensed, it is necessary to periodically monitor the ratio of the volume of syrup dispensed to the volume of dispensed water. This ratio is referred to as the Brix ratio.

U.S. Pat. No. 4,762,251, the entire disclosure of which is incorporated herein by reference, discloses an assembly for determining liquid ratio. This assembly, known as a ratio cup, consists of a cup with a vertical center wall that divides the space inside the cup into two chambers. The wall is positioned so that the chambers have cross sectional areas that have a ratio substantially equal to the ideal syrup to water ratio of the beverage to be dispensed.

The ratio cup is used by placing a device known as a diverter tube under the fountain head to flow the individual syrup and water streams into the individual cup chambers. By side-by-side comparison of the liquid levels in the chambers, the technician can determine if the appropriate volume of syrup is discharged per unit volume of discharged water. Based on this determination, the technician, if necessary, adjusts to the dispensing system.

The above system works reasonably well if, for all beverages dispensed from a dispenser, the syrup to water discharge ratios are to be identical. In practice, these ratios frequently vary, even between two beverages discharged from adjacent heads from the same dispenser. To compensate for this difference, it is necessary to provide the technician with a chart that converts a volume measurement of liquid in one chamber to a virtual volume value equal to the amount of liquid that should be in the second chamber. Thus, the technician is required to visually determine the volume of liquid in one chamber, determine the virtual volume of liquid that should be present based on reference to the look up tables, and determine if the actual volume of fluid is present.

Requiring the technician to perform these steps adds to the overall amount of time it takes to determine whether or not a beverage has a desired Brix ratio. Moreover, in order for this method to work properly, the technician must, based on a visual determination of fluid volume, determine the appropriate virtual volume. Requiring these steps introduces the possibility that, due to human error, the Brix ratio will be inaccurately determined.

The '251 patent also provides a second embodiment with a slider element provided on one of the two chambers. The slider element has a horizontal calibration mark thereon to be aligned with one liquid level (i.e., the liquid level of the syrup) and a horizontal tolerance range also marked thereon. In that embodiment, the tube which receives the water from the fountain dispenser must be filled to a minimum fill line marked on the tube. The horizontal calibration mark on the slider is then aligned with the syrup level and when the level of the water falls within the horizontal tolerance range, an acceptable ratio of water to syrup is indicated.

SUMMARY OF THE INVENTION

The present invention provides a new and useful system and method for determining the ratio of water to syrup discharged from a fountain to form a blended beverage.

In accordance with one aspect of the invention, a measuring assembly is provided for determining whether a beverage dispenser is dispensing an acceptable water to syrup ratio. The measuring assembly includes a primary cup member and a secondary cup member. The secondary cup member is releasably or removably secured or securable to the primary cup. A slider element is mounted for vertical sliding movement along at least a portion of the length of one of the primary and secondary cups, the slider member having a horizontal calibration mark to be aligned with the liquid level of one cup member and the slider element having at least a second horizontal calibration mark displaced vertically from the first calibration mark, with the distance between the first and second calibration marks defining a vertically disposed tolerance range for the water to syrup ratio.

The measuring assembly may further include a plurality of secondary cups of different cross-sectional area from each other with each secondary cup being removably securable to the primary cup and each secondary cup having a slider member mounted for vertical sliding movement along at least a portion of the height of one of the primary and secondary cups, the slider member having a horizontal calibration mark to be aligned with the liquid level of the secondary cup member and the slider element having at least a second horizontal calibration mark displaced vertically from the first calibration mark, with a distance between the first and second calibration marks defining a vertically disposed tolerance range for the water to syrup ratio. Thus, the liquid level in the primary cup should be within the second horizontal calibration mark if the beverage dispenser is functioning within the desired tolerance range for the water to syrup ratio.

A suitable coupling element is provided and attached to the primary cup for removably attaching one of the secondary cups. In one embodiment, the coupling element permits simultaneous attachment of two secondary cups to the primary cup and the attachment may occur on opposed sides of the primary cup.

In another aspect the present invention includes a primary cup removably mountable to one or more of a set of plural secondary cups. Each cup defines a void space for receiving a separate beverage-forming liquid. The cross-sectional areas of the void spaces of the secondary cups are different. A locking assembly integral with the cups selectively and releasably mates each secondary cup so it can be in a fixed side-by-side relationship with the primary cup.

When it is necessary to determine the syrup-to-water discharge ratio for a particular beverage, a specific secondary cup is paired with the primary cup. The specific secondary cup that is attached to the primary cup is one that has a cross sectional area such that the cross sectional area ratio of the pair of cups is substantially identical to desired Brix ratio for the beverage. A slider member attached to one of the cups is used to make a determination if, based on the volume of liquid in both cups, the discharged beverage has the appropriate Brix ratio.

BRIEF DESCRIPTION OF THE DRAWINGS

The invention is pointed out with particularity in the claims. The above and further features and benefits of the invention are discussed in the detailed description below taken in conjunction with the accompanying drawings in which:

DETAILED DESCRIPTION

Figure 1:
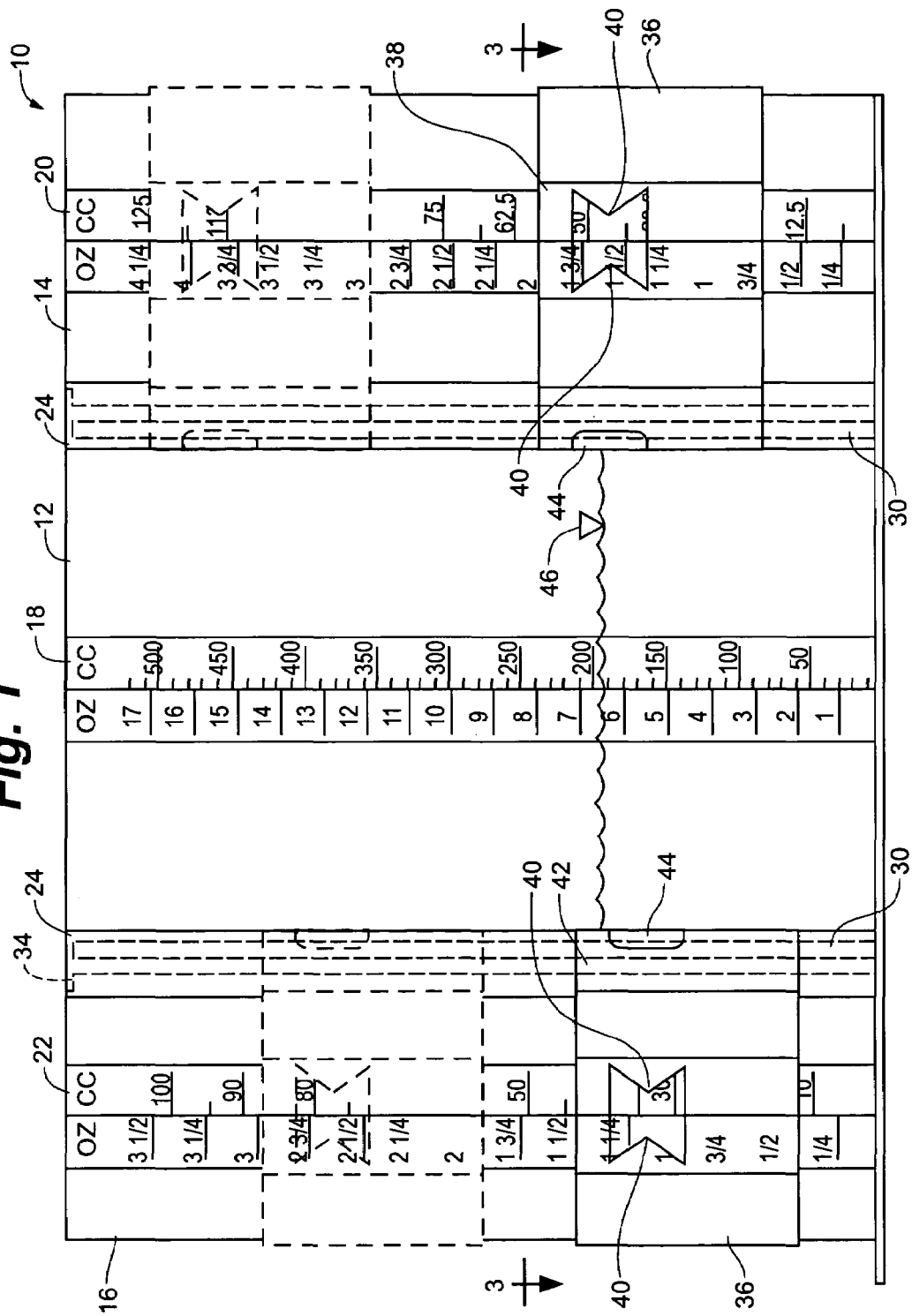
FIG. 1 is front elevational view of a liquid ratio measuring assembly of this invention.
Figure 2:
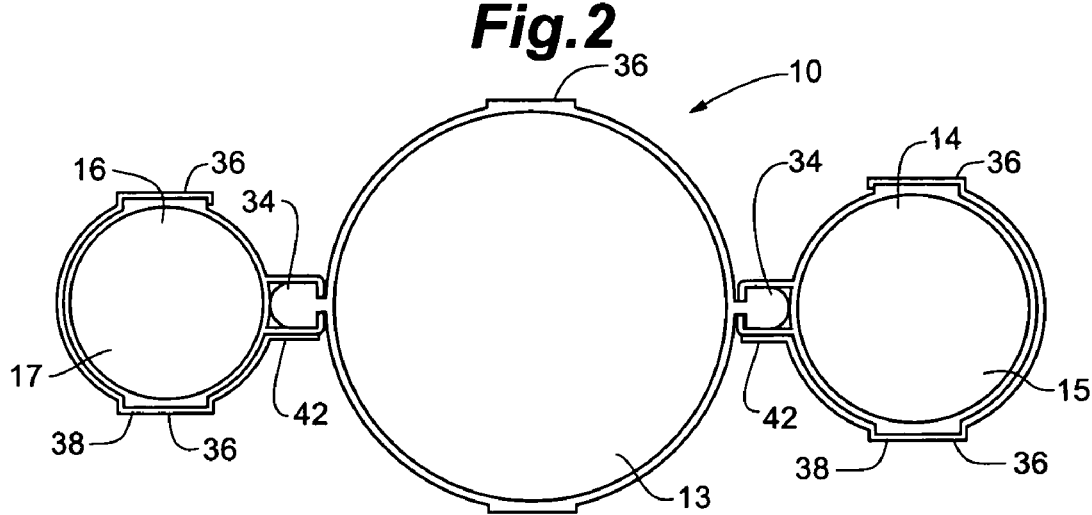
FIG. 2 is a top plan view of the assembly.
Figure 3:
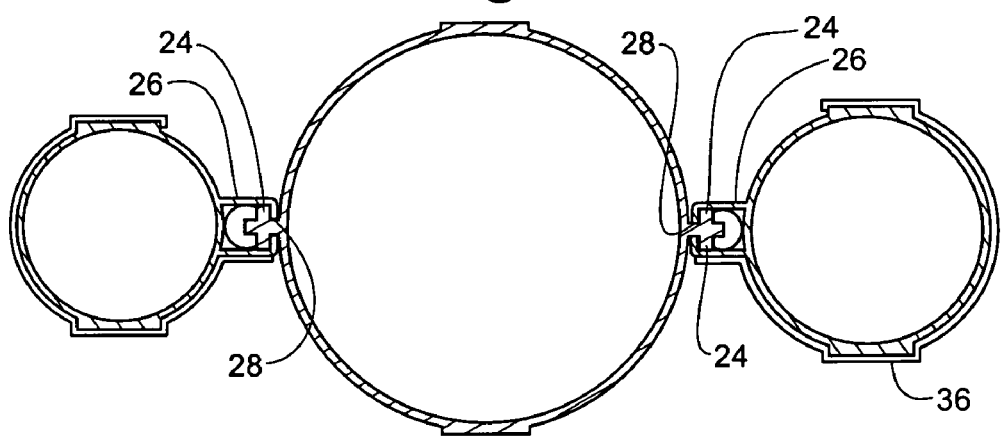
FIG. 3 is a cross sectional view of the cup assembly taken along line 3-3 of FIG. 1.

A liquid ratio measuring assembly 10 of this invention is illustrated in FIGS. 1-3. Assembly 10 includes a primary cup 12 and a plurality of secondary cups, cups 14 and 16 in the Figures. At least one of the secondary cups 14 or 16 is temporarily locked to the primary cup 12 so that two cups are in a side-by-side relationship. In the Figures, both secondary cups 14 and 16 are shown locked to the primary cup 12. It should be appreciated that this feature is optional, not mandatory.

Each of cups 12, 14, 16 is shaped to define a cylindrical, constant diameter void space, spaces 13, 15 and 17, respectively, that extends upwardly from the base of the cup. Secondary cups 14 and 16 are shaped so that the cross sectional areas of their void spaces 15 and 17, respectively, are different. Thus, the void space cross sectional area ratios of each secondary cup 14 and 16, when paired with primary cup 12, are different. For example, the ratio of the cross sectional area of primary cup void space 13 to that of the cross sectional area of the void space 15 of secondary cup 14 may be 4:1. Void space 17 of cup 16 in the Figures has a smaller diameter than void space 15. The cross sectional area of primary cup void space 13 to that of void space 17 of secondary cup 16 may be 5:1.

Each cup 12, 14, and 16 is formed to have along the outer surface of the cup a longitudinally extending calibration surface, surfaces 18, 20 and 22, respectively. In the depicted version of the invention, calibration surfaces 18, 20 and 22 have planar profiles. Surfaces 18, 20 and 22 extend the length of the cups 12, 14 and 16, respectively. Molded, printed or otherwise presented along the calibration surfaces 18, 20 and 22 are lines and legends that indicate volume levels within the associated cup void spaces 13, 15, and 17, respectively.

Figure 4:
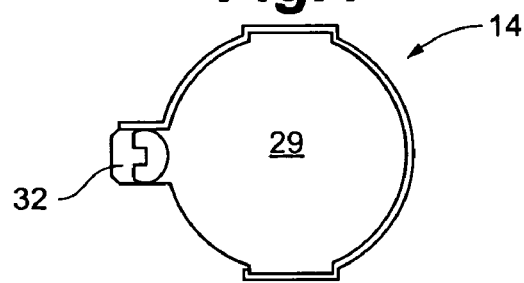
FIG. 4 is a view of the bottom of one of the syrup cups of the assembly of this invention.

A locking assembly integral with the cups 12, 14 and 16 releasably hold each of the secondary cups 14 and 16 to the primary cup 12. The locking assembly includes a flange 24 that is molded to and extends longitudinally along the outer surface of the primary cup 12. In the depicted version of the invention, each flange 24 has a cross-shaped cross sectional shape. The locking assembly also has a U-shaped rail 26 that is integrally attached to and extends longitudinally along the length of the secondary cups 14 and 16. Each rail 26 forms an open face channel 28 along the outer surface of cup 14 or 16. More particularly, rails 26 are dimensioned so that the complementary flange 24 can be inserted in a close sliding fit within the associated channel 28. Channel 28 extends along the entire length of flange 24, except at bottoms 30 thereof wherein the opening terminates short of the extreme bottom so that the channel is effectively closed, at 32, as seen in FIG. 4. This structure ensures proper alignment of the indicia on each of the cups with the indicia on cup 12. The tops of flanges 24 have a large configuration, at 34, which frictionally engages the interior surfaces of rails 26 when cups 14, 16 are fully engaged with cup 12 to prevent accidental removal or movement of cups 14, 16 relative to cup 12. This is also shown partially in dotted lines in FIG. 1.

FIG. 4 depicts the bottom, base plate 29 of secondary cup 14. Primarily, the base plate 29 has a circular shape. This shape reflects the circular cross-sectional profile of void space 15. Base plate 29 is further shaped to have a tab 32 that extends outwardly from the circular section. Tab 32 extends under flange 24 to close cup channel 28. The closing of the channel 28 limits the extent to which the associated primary cup flange 24 can move downwardly relative to secondary cup 14. This arrangement ensures the accurate vertical alignment of the primary and secondary cups 12 and 14, respectively.

The primary cup flanges 24 are further shaped to have, at their top ends, large cross sectional areas. This ensures that the flanges frictionally engage the complementary interior surfaces of the rails 26. This engagement prevents accidental removal or movement of the primary cup 12 and secondary cup 14 relative to each other.

A slide ring 36 is fitted around the outer surface of each secondary cup 14 and 16. Each slide ring 36 is shaped to fit snugly and extend partially circumferentially around the associated cup 14 or 16. In the depicted version of the invention, each slide ring 36 extends at least 50% around the circumference of the associated secondary cup 14 or 16. Slide rings 36 are dimensioned to move vertically along the length of the cups 14 and 16.

Each slide ring 36 has a planar face 38 that overlies the calibration surface 18 or 20 of the cup 14 or 16, respectively, to which the ring is mounted. The planar face 38 is formed with a cut-out that exposes the underlying calibration surface 18 or 20, (cut-out not identified). The cut-out is formed in the slide ring face 38 to define opposed, arrow-like pointers 40.

Slide rings 36 are further formed to each have at one end a vertically extending planar flange 42. The slide rings 36 are formed so that each flange 42 abuts a side surface of the associated cup rail 26. Each flange 42 is formed to define a notch 44 that is directed to the open end of the rail 26, towards the adjacent primary cup 12. Each notch 44 is positioned relative to the associated cup pointers 40 to define a vertically disposed tolerance ratio.

Figure 5:
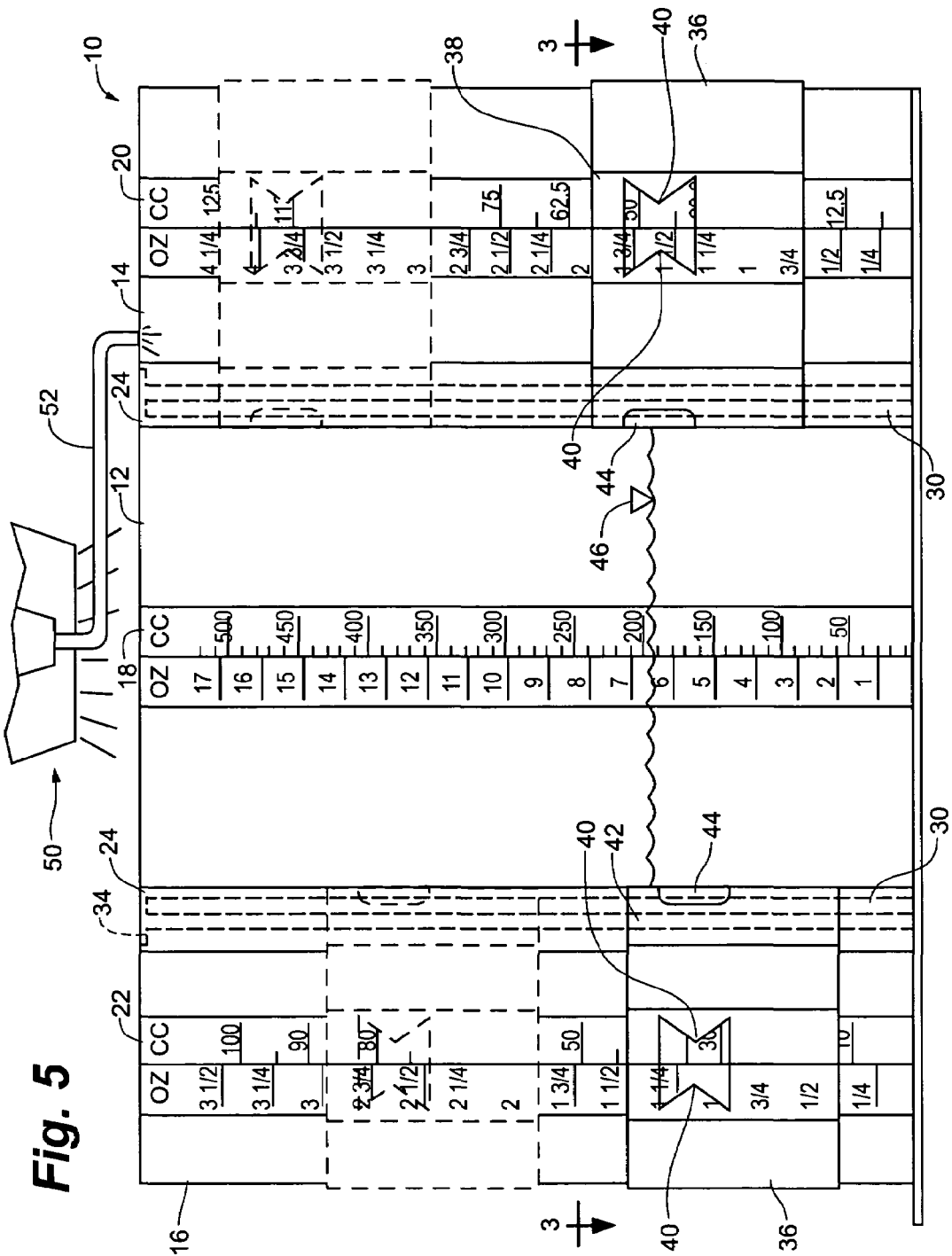
FIG. 5 is a diagrammatic illustration of how the assembly of this invention is used to determine the ratio between two discharged liquids.

FIG. 5 depicts how assembly 10 of this invention may be used to measure the syrup-to-water ratio of a fountain head-dispensed beverage. First, appropriate secondary cup 14 or 16 is attached to the primary cup 12. Both may be attached as illustrated. By "appropriate" it is meant a secondary cup, that when paired with the primary cup 12, results in a cup-to-cup cross sectional area ratio of void spaces that corresponds to the ratio of the volume of syrup that should be dispensed per unit volume water. The cups are placed under a fountain head 50. A known in the art syrup diverter tube 52 is placed under fountain head 50. A volume of beverage is flowed, "poured," from fountain head 50. Diverter tube 52 includes separate conduits through which the water and syrup individually flow. The water is dispensed into primary cup 12. The syrup is dispensed through diverter tube 52 and into secondary cup 14 in FIG. 5. Typically, the pour is performed until the volume of water in the primary cup is between 400 and 500 cc.

Once the pour is completed, assembly 10 is placed so that cups 12 and 16 are level. Slide ring 36 fitted to cup 16 is positioned so that the pointers 40 are aligned with the top of the syrup in secondary cup 16. Then, the technician visually checks to determine whether or not the top level line of the water, represented by ∇ 46 in FIG. 1, is within the area of the associated slide ring notch 44. If the water level line falls within this area, the Brix ratio is correct for the beverage. If the level line is outside of this area, the technician knows, without calculation, that the ratio of dispensed syrup to water should be adjusted.

This invention provides a means to quickly and easily determine the Brix ratio of different beverages that have different Brix ratios. By the pairing of the appropriate secondary cup 14 or 16 for the specific beverage to the primary cup 12, the technician quickly, by simple movement of slide ring 36 and visual inspection of liquid levels, determines if the Brix ratio is appropriate. There is no need to perform any calculations or rely on data derived from look-up charts or tables to determine if the Brix ratio is correct. Both the time it takes to perform these steps and the potential error they introduce into the evaluation is eliminated.

The foregoing description is directed to a specific version of the invention. It should be appreciated that other versions of the invention may have features different from what has been described. For example, there may be times when practicing the invention that it is desirable to simultaneously attach two or more secondary cups to a single primary cup and direct the separate beverage-forming liquids into each cup. This method may be practiced for determining if the Brix ratios are appropriate for a beverage that is formed from water, a primary syrup and one or more secondary syrups. Such a beverage may be for example, a cola beverage that has a supplemental cherry or vanilla flavoring. In order to determine if the appropriate ratio of beverage forming liquids are being discharged, the water is flowed to the primary cup, the cola syrup to a first secondary cup and the supplemental flavor syrup to a second secondary cup. Once the pour is complete, the measurements are made as before.

Moreover, in some versions of the invention, secondary cups that have identical cross-sectional areas may be provided. In these versions of the invention, the identical cups would have different slide rings 36. These slide rings 36 would differ in the length of the notches 44 formed in the rings. Thus, if there is a beverage that, for taste reasons, needs a very precise Brix ratio, the secondary cup used for measurement of this beverage would have a slide ring 36 with a short notch 44. Measurements for a beverage that does not require a very precise Brix ratio are made using the secondary cup that has a slide ring 36 with a longer notch 44.

Also, the physical structure of the invention may vary from what has been described. For example, there is no requirement that, in all versions of the invention, the indicia formed on the slide rings 36 to indicate levels be cut-out spaces defined by the rings. The slide rings may be transparent. Markers printed or otherwise applied to the rings indicate where each is to be set based on fluid level and the level of acceptable water in the associated primary cup. A slide bar, formed of less material than a ring, may be slidably attached to the cups.

Also, in some versions of the invention, the primary cup may be the only cup provided with a slide ring or slide bar. In these versions of the invention, once the pour is complete, the primary cup slide ring/bar is set based on the water level in the cup. A visual marker on the ring/bar indicates the acceptable volume range of syrup for the pour. The technician determines if the syrup level in the secondary cup is within the range indicated by the marker to evaluate whether or not the beverage has an appropriate Brix ratio. An advantage of this assembly is that it eliminates the expense of mounting a slide ring/bar to each secondary cup.

Similarly, other assemblies may be used to releasably lock the secondary cups to the primary cup. For example, the cups may be provided with complementary interlocking fingers. An advantage of this type of assembly is that the cups, when locked together, are inherently held in the proper vertical alignment. However, it is anticipated that in many versions of the invention, it would be preferable to allow the cups to have some degree of vertical movement relative to each other. This would allow the technician to more easily hold both cups during the pour. After the pour, the cups are placed in a fixed vertical and side-by-side relationship to allow the Brix evaluation to be completed.

It should further be understood that it may not always be necessary to physically mate the cups together prior to actually performing the pour. After the pour is completed, the cups are placed in the side-by-side fixed vertical relationship to complete the evaluation.

Also, the illustrated circular cross sectional shapes of the cups should similarly be considered exemplary, not limiting. For space saving reasons and/or to take advantage of alternate locking assemblies, cups may be provided with a desired cross-sectional configuration, such as a polygonal cross sectional profile, for example.

Furthermore, while the invention is generally described for use in measuring Brix ratios of fountain-dispensed beverages, it should be understood that this is likewise, exemplary, not limiting. The assembly of this invention may be used in other processes to quickly determine if liquid discharge ratios are appropriate. For example, the assembly may be used in a bottling plant or chemical processing facility to determine if two or more liquids that are simultaneously discharged to form a product, or intermediate product, are discharged in the appropriate ratio.

Therefore, it is an object of the appended claims to cover all such variations and modifications that come within the true spirit and scope of this invention.

What is claimed is:

1. A measuring assembly for determining whether a beverage dispenser is dispensing an acceptable water-to-syrup ratio comprising:
   a primary cup member having a height;
   a secondary cup member removably secured to the primary cup and said secondary cup having a height; and
   a slider element mounted for vertical sliding movement along at least a portion of the height of one of the primary and secondary cups, the slider member having a horizontal calibration mark to be aligned with the liquid level of one cup member and the slider element having at least a second horizontal calibration mark displaced vertically from the first calibration mark, with the distance between the first and second calibration marks defining a vertically disposed tolerance range for the water-to-syrup ratio.

2. The measuring assembly of claim 1 further comprising a plurality of secondary cups of different cross-sectional area from each other, each secondary cup being removably securable to the primary cup and each secondary cup having a respective slider member mounted for vertical sliding movement along at least a portion of the height of one of the primary and secondary cups, each slider member having a horizontal calibration mark to be aligned with the liquid level of one cup member and the slider element having at least a second horizontal calibration mark displaced vertically from the first calibration mark, with the distance between the first and second calibration marks defining a vertically disposed tolerance range for the water-to-syrup ratio.

3. The measuring assembly of claim 2 further comprising a coupling element attached to the primary cup for movably attaching one of the secondary cups.

4. The measuring assembly of claim 3 further comprising a second coupling element wherein the coupling elements permit simultaneous attachment of two secondary cups to the primary cup.

5. An assembly for measuring the syrup-to-water ratio for a plurality of beverages that have different syrup-to-water ratios, said assembly including:
   a primary cup, said primary cup having a void space with a cross sectional area; a plurality of secondary cups, each said secondary cup having a void space with a cross sectional area wherein, the void space cross sectional areas of the secondary cup void spaces are different from each other;
   a coupling assembly attached to at least one of said primary cup or to each of said secondary cups for releasably mating any one of said secondary cups to said primary cup; and
   a slider member attached to said primary cup or, a plurality of slider members, each said slider member attached to a different said secondary cup, said slider or each one of said plurality of sliders being moveable along the length of said cup to which said slider is attached and having a first indicia for aligning said slider with a liquid level in said cup to which said slider is attached and a second indicia in a set spatial relationship to said first indicia that indicates an acceptable liquid level in the said cup mated to said cup to which said slider is attached.

6. The measuring assembly of claim 5, wherein said plurality of sliders is attached to said secondary cups.

7. The measuring assembly of claim 5, wherein said coupling assembly includes: a first member attached to said primary cup, and a plurality of second members, each said second member attached to a separate one of said secondary cups, wherein said first member and said secondary members are formed so that each said secondary member is able to releasably engage said first member.

8. The measuring assembly of claim 5, wherein said coupling assembly includes:
   a first member that extends outwardly from said primary cup; and
   a plurality of secondary members, each said secondary member extending outwardly from each said secondary cup, each said secondary member shaped to define a void space for receiving said first member.

9. The measuring assembly of claim 5, wherein said coupling assembly includes:
   a first structural member that extends outwardly from said primary cup;
   a rail attached to each said secondary cup, said rail defining a channel in which said first structural member is slidably received; and
   a second structural member attached to each said secondary cup, each said second structural member positioned to extend into the area subtended by the rail channel of said secondary cup to limit vertical movement of said primary cup first structural member.

10. The measuring assembly of claim 5, wherein said slider or each of said plurality of said sliders is formed to define one of said slider indicia.

11. The measuring assembly of claim 5, wherein: said slider or each of said plurality of sliders is formed to extend at least 50% around the circumference of said cup to which said slider is attached.

12. The assembly of claim 5 further comprising:
   said primary cup having a base and the void space that extends upwardly from the base with a constant cross-sectional area;
   each said secondary cup having a base and formed to have a void space that extends upwardly from the base with a constant cross sectional area wherein, the cross-sectional areas of each of said secondary cup void spaces being different from each other;
   the coupling assembly comprising: a first member attached to said primary cup; and a plurality of second members, a respective one of each of said second members being attached to one of said secondary cups, said first member and said second members being configured to engage so that said coupling assembly releasably holds any one of said secondary cups to said primary cup; and wherein
   a separate slider member is attached to each one of said secondary cups to move along a section of said secondary cup having the constant cross sectional area, each said slider having a first indicia for aligning said slider with a liquid level in said secondary cup and a second indicia in a spatial relationship to said first indicia that indicates an acceptable liquid level range in the primary cup.

13. The measuring assembly of claim 12, wherein:
   said coupling assembly first member comprises a finger that extends outwardly from said primary cup; and
   each said coupling member second member comprises: a rail that extends outwardly from said secondary cup to which said second member is attached, said rail defining a channel for slidably receiving said finger of said primary cup; and a projection that extends outwardly from said secondary cup into said channel.

14. The measuring assembly of claim 12, wherein:
   each said secondary cup is formed to have a curved cross sectional profile and has an outer surface with an arcuate section that has a planar, longitudinally extending outer face; and
   each said slider is positioned to extend over the planar face of said secondary cup to which said slider is attached and said slider first indicia is formed on a section of said slider disposed over the planar face of said secondary cup.

15. The measuring assembly of claim 12, wherein each said slider is shaped to define at least one of said slider indicia.

16. The measuring assembly of claim 12, wherein each said slider extends at least 50% around the circumference of said secondary cup to which said slider is attached.

17. The measuring assembly of claim 12, wherein:

said coupling assembly first member includes a finger that extends outwardly from said primary cup;

each said coupling member second member includes a rail that extends outwardly from and longitudinally along said secondary cup to which said second member is attached, said rail having a channel for slidably receiving said finger of said primary cup;

each said secondary cup slider is formed to have a flange that extends over a surface of coupling member rail of said secondary cup to which said slider is attached and the second slider indicia is disposed on said flange.

18. A method of determining the water-to-syrup ratio of a fountain head-dispensed beverage, said method including the steps of:

providing a measuring system comprising:

a primary cup member having a height; a plurality of secondary cups of different cross-sectional area from each other, each secondary cup being removably securable to the primary cup and each secondary cup having a respective slider member mounted for vertical sliding movement along at least a portion of the height of one of the primary and secondary cups, each slider member having a horizontal calibration mark to be aligned with the liquid level of one cup member and the slider element having at least a second horizontal calibration mark displaced vertically from the first calibration mark, with the distance between the first and second calibration marks defining a vertically disposed tolerance range for the water-to-syrup ratio;

selecting and releasably mounting a selected one of the secondary cups to the primary cup based on the appropriate water-to-syrup rate ratio of the beverage to be measured;

discharging from the fountain head the syrup and water forming the beverage wherein, in said discharge step, the water is flowed into the primary cup and the syrup is simultaneously flowed into the selected secondary cup;

moving the slider attached to the selected secondary cup to a select position based on the level of liquid in the secondary cup to which the slider is attached; and comparing the level of liquid in the primary cup to an indicia on the slider to determine if the syrup-to-beverage ratio for the beverage is within a tolerance range.

19. The method of determining syrup-to-water ratio of claim 18, wherein, in said releasably mounting step, the selected secondary cup is slidingly attached to the primary cup.

20. The method of determining syrup-to-water ratio of claim 18, wherein, as a consequence of attaching the selected secondary cup to the primary cup, the primary cup and secondary cup are placed in a predetermined vertical relationship.

* * * * *